June 15, 1954     J. A. HERRMANN     2,681,392
TROLLEY DUCT

Filed May 25, 1950                                 2 Sheets-Sheet 1

INVENTOR.
John A. Herrmann.
BY
HIS ATTORNEY.

INVENTOR.
John A. Herrmann.
BY
HIS ATTORNEY.

Patented June 15, 1954

2,681,392

UNITED STATES PATENT OFFICE 2,681,392

TROLLEY DUCT

John A. Herrmann, Grosse Pointe Farms, Mich., assignor to BullDog Electric Products Co., Detroit, Mich., a corporation of West Virginia Application May 25, 1950, Serial No. 164,248

2 Claims. (Cl. 191—23)

This application relates to electrical distribution systems of the trolley duct type.

A particular object of the present invention is to provide a novel form of trolley duct characterized by extreme simplicity of design, promoting economy of manufacture and assembly while at the same time preserving a high degree of smoothness of operation of the trolleys along the duct.

A further object of the present invention is to provide a trolley duct characterized by the provision of a channel in which open bottom bus bar strips are mounted and partially exposed, with suitable means being provided in the form of insulation strips for effectively shielding the bus bars against accidental contact and for providing restricted access to the bus bars from the open bottom of the channel, such access being in the form of long, narrow, deep slots, accessible only to properly shaped collector contacts of trolleys arranged to ride along the duct.

Still further objects of the present invention will appear upon reference to the following description and the appended drawings.

Figure 1:
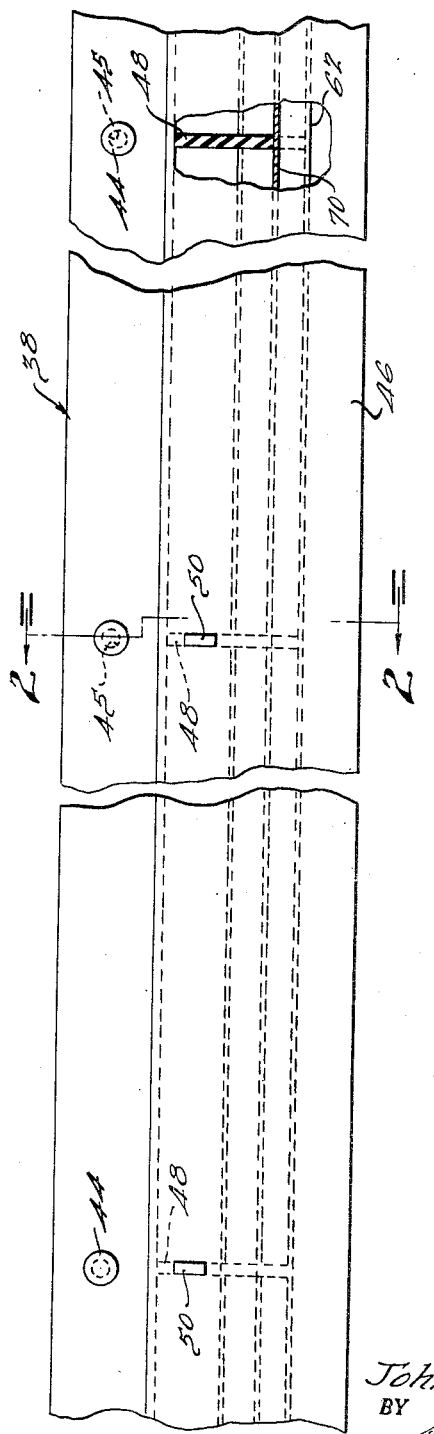
Fig. 1 is a fragmentary side view of a duct run.
Figure 2:
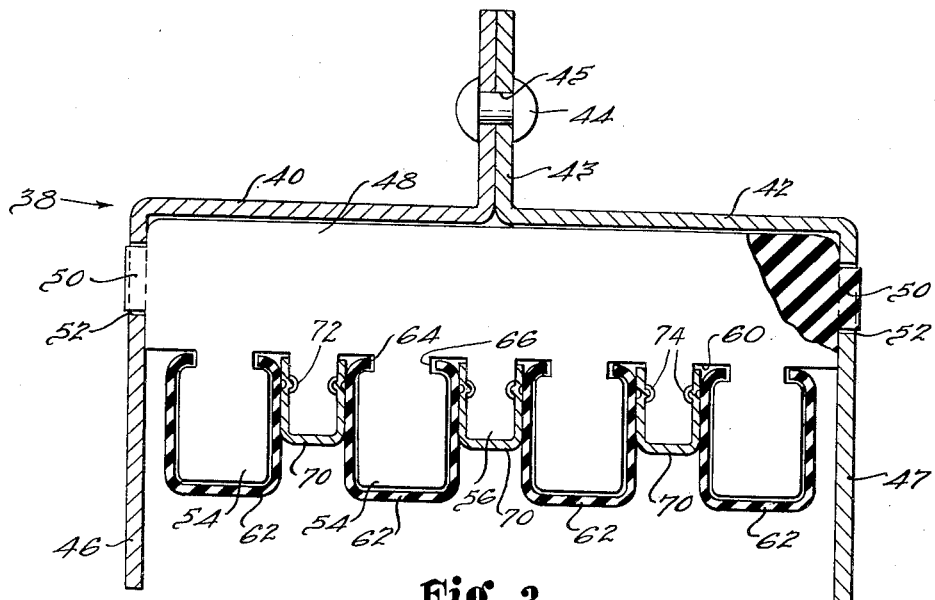
Fig. 2 is a transverse section at an insulating support as if on line 2—2 of Fig. 1.

Referring to the drawings, it will be observed that Figs. 1 and 2 show a trolley duct which includes a casing 38 made up of two halves 40 and 42 and which may be of sheet metal, or other suitable material. Each half is of ogee form and has a central flange 43. Meeting flanges may be secured together, as by rivets 44 passed through holes 45, some of which holes may be utilized to receive bolts or other fastening devices enabling the duct to be connected to vertical hangers not shown. Together, the meeting flanges 43 form a central top supporting rib for the channel casing.

At longitudinally spaced intervals along the sides 46—47 of the duct are transverse insulator supports 48.

In the form shown in Figs. 1 and 2 these insulator supports 48 are thin flat plates of insulation material having laterally projecting lugs 50 cooperating with slots 52 of the side walls of the duct to enable the insulators to be snapped into place in the ducts through the open bottom of the duct, with advantage being taken of the normal resiliency of the sheet metal or other material forming the sides 46 and 47 of the channel.

The insulator supports 48 are formed with downwardly projecting portions or teeth 54 and 56, the former being larger in extent than the latter. The portions 54 are separated from the portions 56 by slots 60.

Resilient U-shaped insulator strips 62 may be snapped over aligned teeth 54 of the several insulator supports of insulator 48 and their inwardly directed edges 64 will interlock in interlocking notches 66 near the bases of the teeth 54 to form continuous insulators passing several adjacent insulator supports 48.

Resilient U-shaped bus bars 70 in the form of long strips may be disposed around the teeth 56 of adjacent insulator supports 48 to connect them and to provide runs of bus bar. Snap ribs 72 on the sides of the bus bars project into snap grooves 74 on the sides of the teeth 56 of adjacent insulator supports 48 to interlock the bus bars with snap action on the several insulator supports 48.

It will be observed that the insulator strips 62 effectively shield the bus bar strips 70 throughout their length, exposing only the undersurface of such bus bars to the open bottom of the channel, with access restricted by the long, narrow and deep slots between adjacent insulator strips 62.

In assembling the duct of Figs. 1 and 2, the casing is first fabricated to the channel form by securing the halves 40 and 42 to each other at the meeting flanges 43 and thereafter the insulator supports 48 may be snapped into place through the open bottom of the channel. Then the insulators 62 may be snapped into place on the aligned teeth 54 of a series of insulator supports 48 with such insulator strips snapping into place by the cooperation of the parts 64 and 66. The assembly is completed by snapping the bus bar strips 70 into place with the parts 72 and 74 cooperating for interlocking the bus bars in place.

Except for the securing of the halves 40 and 42 at 44 no machine operations or tools are required to assemble the duct. An assembler having a supply of formed casings and a supply of supports 48, strips 62, and strips 70 may assemble the complete bus duct without the use of tools or machinery. All the parts are held in a unitary assembly by the tendency of the side walls 46 and 47 of the channel to resist lateral expansion.

The duct here shown is such that though the lower edges of the bus bars are exposed for proper access to the open bottom of the channel of the duct, nevertheless these bus bars are effectively shielded throughout their length by the insulator supports 62 which form long, deep, and narrow grooves providing the only paths for access to the bus bars from outside the duct.

Figure 3:
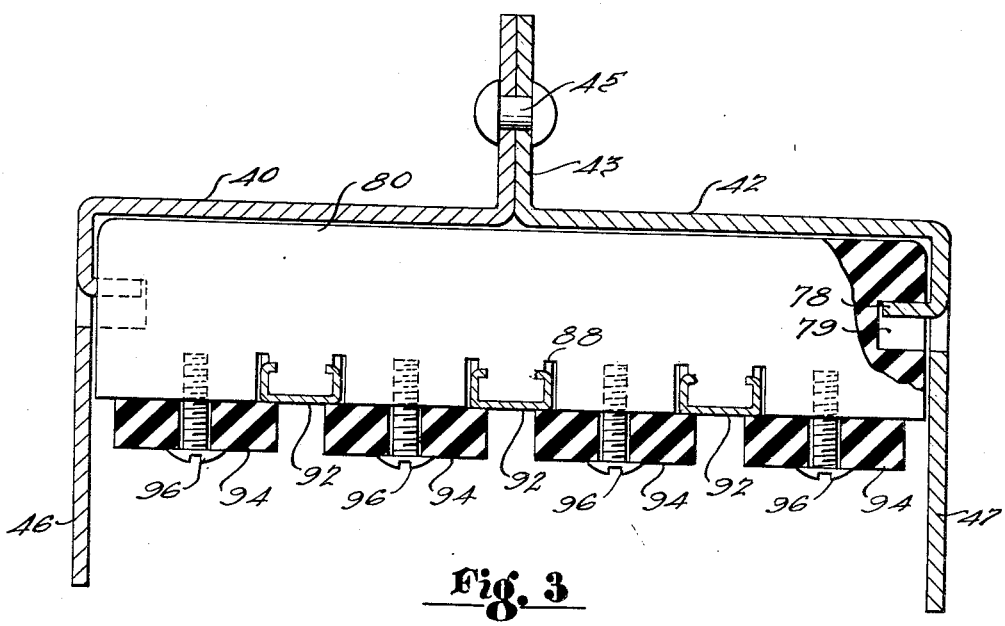
Fig. 3 is a view like Fig. 2 but showing a modified form of construction.

In the construction of Fig. 3 the side walls 46 and 47 of the channel halves 40 and 42 which meet at 43 are formed at longitudinally spaced intervals with inwardly directed lugs 78 which seat themselves within grooves or notches 79 on the edges of transverse insulator supports 80 whereby the ducts and such insulator supports are maintained in assembly.

The lower edges of such insulator supports, of considerably greater thickness than the thin flat insulator supports 48 of the form shown in Fig. 2, are formed with a plurality of notches 88 which receive U-shaped bus bars 92 held in place not only by their own tendency to expand, due to their resiliency, but also by the insulator strips 94 secured to the under edges of the supports 80 by the mounting screws 96 threading into tapped inserts of the supports 80 as indicated. Adjacent edges of the strips 94 define long, deep, and narrow grooves providing restricted access only to the bus bars.

The normal resiliency of the bus bars aids in maintaining firm the assembly of the insulator supports 80, the insulator strips 94, and the bus bars themselves, because of the tendency of the bus bars to expand and bias all parts for resilient clamping.

The assembly is as follows: the casing halves 40 and 42 are loosely held to each other to form a channel and the insulator supports 80 are loosely disposed therein, being held there by the cooperation of channel lugs 78 and the notches 79 of the supports 80. When so assembled the casing halves 40 and 42 are secured to each other by the use of rivets, bolts, or welding at 43 to complete the sub-assembly of a channel with transverse insulator supports. Thereafter the bus bar strips 92 are snapped into place in the aligned notches 88 and the insulator strips 94 are fastened in place by the screws 96, to complete the assembly.

In both forms of duct disclosed herein the assembly of the channel, the transverse supports, the bus bar strips, and the insulator strips, may be effected in a very easy manner and the parts held themselves in place to a considerable extent by spring tension of certain of the parts.

It will also be observed that the duct construction here shown is characterized by the effective shielding of the bus bar strips from the open bottom of the channel by the provision of insulator strips which provide only narrow, deep, restricted slots for access to the undersurfaces of the bus bars.

While the duct herein disclosed is primarily for use with a trolley type collector, it may also be used with other forms of take-offs, such as the stationary types.

Now having described the trolley duct herein disclosed reference should be had to the claims as follows:

1. A trolley duct comprising a casing having a top wall and sides, transverse insulator supports at longitudinally spaced points of the casing, cooperating means on the side edges of such supports and on the sides of the casing for mounting the supports, said supports having slots defining teeth between them of alternately large and small size, U-shaped bus bar strips disposed about said small teeth of such aligned supports, said bus bar strips having lug formations projecting inwardly from their sides and interlockingly cooperating with grooves in the sides of said teeth so as to be retained in position thereby, and insulator strips mounted on said large teeth of aligned supports.

2. A trolley duct comprising a casing having a top wall and sides, transverse insulator supports at longitudinally spaced points of the casing, cooperating means on the edges of such supports and on the sides of the casing for mounting the supports, said supports having slots defining teeth alternately large and small in size, U-shaped bus bar strips disposed about said small teeth of such aligned supports, said bus bar strips having lug formations projecting inwardly from their sides and interlockingly cooperating with grooves in the sides of said teeth so as to be retained in position thereby, and U-shaped insulator strips disposed about said large teeth, such strips having their edges flared inwardly to cooperate with the slots in said supports for retaining said strips in place on the teeth of said supports.

References Cited in the file of this patent

UNITED STATES PATENTS

| Number | Name | Date |
| --- | --- | --- |
| Re. 20,005 | Frank et al. | June 16, 1936 |
| 2,170,300 | Frank | Aug. 22, 1939 |
| 2,304,924 | Jackson et al. | Dec. 15, 1942 |
| 2,495,526 | King | Jan. 24, 1950 |